United States Patent [19]

Sorace

[11] Patent Number: 4,831,768
[45] Date of Patent: May 23, 1989

[54] FISHING LURE

[76] Inventor: Salvatore Sorace, 600 Ocean Ave., Cape May Point, N.J. 08212

[21] Appl. No.: 125,338

[22] Filed: Nov. 25, 1987

Related U.S. Application Data

[63] Continuation of Ser. No. 717,893, Mar. 29, 1985, abandoned.

[51] Int. Cl.⁴ ............................................. A01K 85/00
[52] U.S. Cl. ................................... 43/42.09; 43/42.05
[58] Field of Search ............................ 43/42.05, 42.09

[56] References Cited

U.S. PATENT DOCUMENTS

| | | | |
|---|---|---|---|
| 1,454,820 | 5/1923 | Readle | 43/42.09 |
| 2,625,767 | 1/1953 | Pokras | 43/42.09 |
| 2,983,065 | 5/1961 | Ferguson | 43/42.09 |
| 3,867,781 | 2/1975 | Wolfe | 43/42.09 |
| 4,054,004 | 10/1977 | Schott | 43/42.09 |
| 4,215,506 | 8/1980 | LeBoeuf | 43/42.05 |
| 4,520,588 | 6/1985 | Hindermyer | 43/42.05 |

Primary Examiner—Kurt Rowan
Attorney, Agent, or Firm—Caesar, Rivise, Bernstein, Cohen & Pokotilow, Ltd.

[57] ABSTRACT

A fishing lure particularly adapted for deep sea sport fishing. The fishing lure assembly comprises a head, a tail, a leader, and at least one hook. The leader, head, and hook remain permanently assembled. The tail portions may be selectively changed to give the overall lure a different appearance, as may be suitable for the fishing conditions. The affixation means are simple, inexpensive, rugged, and capable of easy manipulation under adverse conditions. When assembled, the entire lure has structural integrity and reliability.

9 Claims, 1 Drawing Sheet

FISHING LURE

RELATED APPLICATION

This application is a continuation of U.S. application Ser. No. 717,893, filed Mar. 29, 1985, and entitled "Fishing Lure."

BACKGROUND OF THE INVENTION

1. Field of the Invention

This invention relates to sport fishing. More particularly, it relates to fishing lures of the type particularly adapted to deep sea or ocean fishing. It relates to means and method for providing a lure including a head and a tail wherein the tail may be changed without affecting the other portions of the fishing apparatus.

2. Prior Art

Fishing lures of many different appearances, and intended for the same class of sport fishing are well known. Previous expedients known to vary the appearance of a lure have relied upon relatively major changes in the equipment, or have relied upon removable portions. To the best knowledge and belief of the inventor, such prior expedients have involved structures which are substantially more complex or more expensive than the present invention, or are less rugged or less convenient to change in the field. Known United States patents which may be of interest are U.S. Pat. Nos. 4,380,884; 3,867,781; 4,006,551; 4,215,506; 3,947,989; 3,393,465; 3,359,674; 2,152,971; 4,163,337.

SUMMARY OF THE INVENTION

A fishing lure is provided. The fishing lure is particularly adapted for deep sea or ocean fishing. The type of lure with which this invention is concerned has a head and a tail portion together with one or more hooks. The overall appearance of the lure is intended to simulate the appearance of a bait fish or at least to be attractive to the game fish, so that the game fish will strike and be caught on the hooks.

A particular intent of the present invention is to provide means and method whereby the overall appearance of the lure may be altered to suit the conditions, for example the type of fish encountered, in a simple, inexpensive, reliable and quick manner. An object is to provide a single assembly of leader, head, and hooks, and a plurality of tails of varying appearance. Any one of the tails may be selectively firmly and easily affixed to the head, to change the overall appearance. Thus, there is no necessity to provide a large number of head, tail, leader and hook assemblies to attain this result.

Another object is to provide a fish lure in which the removable tail is firmly and positively engaged to the head so that the conditions to which it is subjected will not tend to cause the loss of the tail. Another object is to provide an affixation means which can be simply and easily manipulated under adverse conditions, and which will bear up under rough handling, and which will be relatively inexpensive.

The hooks are attached to the end of the leader. The head rides on the leader. The head is provided at the rear with a threaded stud through which the leader passes. The tail is provided with a threaded socket. The bore of the threaded socket is large enough so that it may be passed over the hooks from the rear, and engage the threaded stud.

DESCRIPTION OF THE PREFERRED EMBODIMENT

The fishing lure, generally designated 10, is of a type that is generally and preferably used in deep sea fishing. That is, it is adapted for being carried at relatively high speeds through ocean water, and to catch relatively large game fish. For the purpose of establishing context, it is noted that the typical gap in between the tip of the hook and the shank of the hook may be on the order of ⅞ of an inch, and the length of a typical lure from the front of the body to the end of the skirt, streamer or tail may be on the order of 11 inches. These dimensions are not in themselves critical.

The lure comprises a head generally designated 12. The head 12 is a solid piece, generally and preferably of any suitable synthetic plastic. It is preferably provided with means to make it simulate the head of a bait fish. For example, simulated eyes 36 are preferably provided. A convenient construction has a plastic simulation in roughly the color of a fish's head, surrounded by a clear plastic sheath to protect the pigment. The shape of the head is generally cylindrical, preferably tapered somewhat toward the front, and in general suggesting the head of a small fish.

Figure 1:
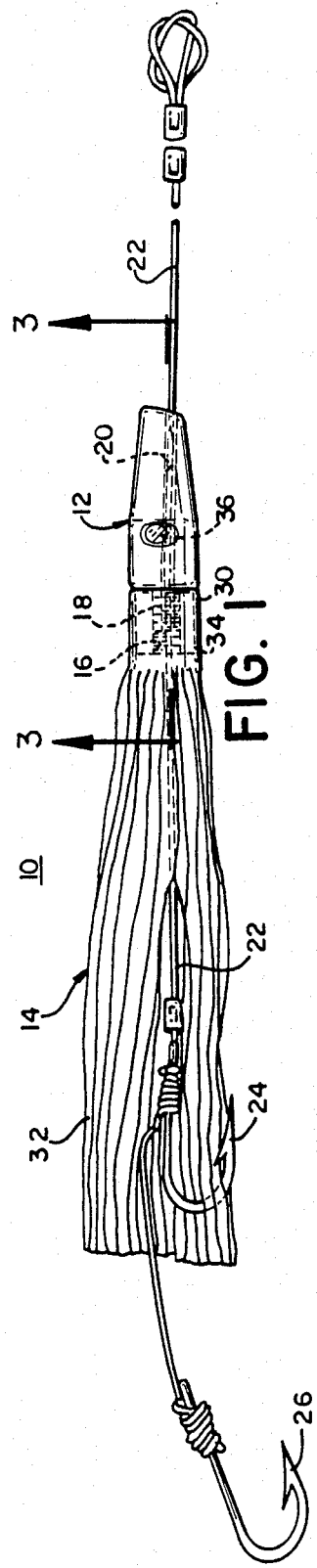
FIG. 1 is a side elevation of the fishing lure, partially fragmented.

At the rear of the head, it terminates in a threaded stud 18. Arranged longitudinally through the head, from front to back, centrally disposed, and running through the center of the threaded sutd 18 is a bore 20. A leader 22 is provided. This is preferably a length of nylon monofilament. In a typical embodiment, the diameter of this monofilament may be on the order of 1/16 of an inch. At one end, the leader 22 terminates in a loop, as shown at the right hand side of FIG. 1, or in any other convenient or known means whereby it may be attached to the main portion of the fishing line, not shown. As shown in FIG. 1, the end of the leader 22, at the right hand side, after being looped and intertwined, is bound together with permanent clips. The details of this termination structure are known art and are not part of the novelty of the present invention.

The leader extends through the bore 20. The external dimensions of the leader relate to the internal dimensions of the bore so that there is a snug but sliding fit preferably, although more clearance can be provided.

Figure 2:
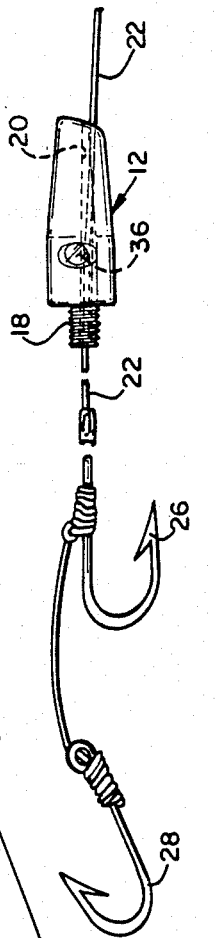
FIG. 2 is an exploded view thereof, partially fragmented.

The leader 22 continues unbroken through the bore 20 and exits at the rear end of the stud 18. At least one hook is affixed to the rear end of the leader 22. Preferably, a multiplicity of hooks, very frequently two such hooks, are provided. As shown in FIG. 2, there is a first hook 26 and a second hook 28. These are conventional barbed fish hooks. One way of fastening the leader 22 to both hooks is run the leader along the shank of the first hook 26, then take it in a helix to hold its length against the shank, tie a simple knot to hold the helix in place, and then continue it to the second hook 28, where the tying procedure is repeated. The details of this tie are known art and are not part of the novelty of the present invention. Also, as shown in FIG. 2 a clip may be crimped around the leader 22 between the first hook 26 and the back of the stud 18 so that the travel of the head 12 rearwardly along the leader is limited.

Figure 3:
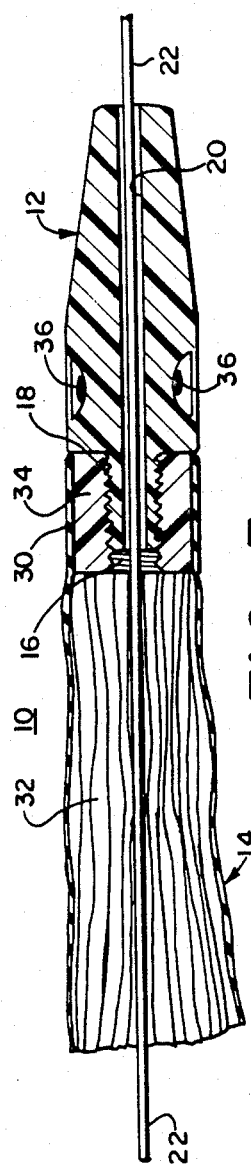
FIG. 3 is a cross-sectional view taken along line 3—3 of FIG. 1.

In FIG. 1, the structure that has been described in connection with FIGS. 2 and 3 is shown in a complete assembled showing. In FIG. 1, the hooks 26 and 24 are shown facing in the same direction, whereas in FIG. 2 they are shown facing in opposed directions. These two showing simply illustrate casual arrangements of choice.

An important part of the structure is the provision of the skirt, streamer, or tail generally designated 14. The concept of such a tail as part of the fish lure is known to act to the effectiveness of the lure. The details of the tail 14 are best initially described in connection with FIG. 2. The tail 14 has a body 30, which is cylindrical and of the appoximately same outer dimension as the outer dimension of the head where the body 30 adjoins the head.

The body 30 is preferably made of a flexible tube of plastic. As shown, the major portion of the length of the tail is comprised of a plurality of strips 32, extending around the entire circumference of the tail. A typical embodiment might have about fifteen of such strips, although the exact number is not critical. One way of making the body and strip component is to provide a tube of flexible plastic material, and then to slit the tube along most of its length, so that the result is a plurality of strips hanging from a solid cylindrical portion. The tail 14 is preferably colored to approximate the color of a bait fish, or is colored or treated to provide any visual aspect found in the known art of fishermen to be attractive to the fish sought to be caught. In a typical embodiment, the length of the body may be about one inch and the length of the strips 32 may be on the order of seven inches.

Another portion of the tail 14 is a plug 34. This is a relatively more rigid cylindrical member provided with an internal female threaded socket 16. As best shown in FIG. 3, the socket 16 extends entirely through the plug 34. It is apparent that the body 30 fits over the plug 34 snugly. Preferably, it is affixed with adhesive or with some other positive fastening means so that it does not come loose.

In FIGS. 1 and 3, the tail 14 is shown assemblied to the head 12 to form a unitary structure. FIG. 1 best shows the entire fishing lure in its operative condition. The hooks lie roughly centrally within the circumference of the strips 32. As shown, one hook may conveniently lie within the actual shroud of the strips 32 and the other hook lie beyond the ends of the strips longitudinally. The leader is attached to the main fishing line. Typically, the boat trolls, moving through the water and trailing the lure behind it. The appearance and motion of the lure, including the wiggling of the strips 32 and the tail 14, attract fish which strike at the lure and are caught on the hooks.

Compared to many other types of sport fishing, this type of fishing is relatively rugged and it is very important that the structural integrity of the line, leader, lure, and hook assembly be maintained. Thus, the positive gripping action of the threaded stud and the threaded socket is very important, because it avoids the problems found in other expedients of undesired separations taking place.

Fisherman find that depending on the circumstances, different colors or configurations of lures are desirable in attracting the fish. The principal component of the appearance as far as the fish is concerned is the relatively major portion of the tail 14. It has been found that providing a selection of tails with different appearances to the fish is a desirable technique. Therefore, the fisherman wishes to be able to selectively change the tail as it is assembled to the head.

The tail 14 may be removed from the head by simply unscrewing it. Then, the tail is free to move backwards along the leader. The threaded socket 16 then constitutes a hole or passageway through which the hooks may be passed. It is apparent then when it is desired to pass the tail past a hook, it is moved along the shank and then moved in a curving line so that it follows the shape of the hook. It is found that this is convenient to do. When it is desired to replace a removed tail with another tail, the procedure is reversed, the threaded socket 16 being led along the curvature and then along the shank of each hook in turn. It is then assembled to the head 12 by engaging the threaded elements as has been described.

Not only does this structure provide a positive and secure affixation, but it permits removal and reaffixation by fisherman under sometimes adverse conditions, without requiring delicate operations. Also, the rough usage to which such devices are subjected is less likely to damage the present lure than certain past expedients, because the selective affixation structure in the present lure is inherently more rugged and less likely to get out of alignment or adjustment. The present invention thus provides a means by which a variety of effectively different lures may be provided without the necessity of providing a variety of complete assemblies. That is, a single leader with hooks and head may be selectively combined with a number of tails, to provide a variety of effective lures.

I claim:

1. A fishing lure comprising a head, said head having a bore therethrough from the front to the back thereof, and having threaded affixation means comprising an externally threaded, rearwardly extending stud projecting from the back thereof, said bore passing through said stud; and a tail, said tail having a circumferentially continuous plug at the forward end thereof, said plug having threaded affixation means comprising an internally threaded socket configured and dimensioned to selectively, threadedly engage said rearwardly extending stud on said head, said threaded socket on said plug extending through said plug from the front to the back thereof and being provided by a continuous peripheral wall that is free of a slot therethrough through which a fishing leader can pass, said internally threaded socket having an internal diameter of sufficient dimension for permitting the passage therethrough of a barbed fishing hook; and said tail including a rearwardly trailing shroud portion firmly and permanently affixed to said plug, said shroud comprising a forward, circumferentially continuous body permanently affixed to an outer circumerentially continuous surface of the plug and terminating in a plurality of rearwardly extending flexible strips, said head being configured to simulate the head of a bait fish.

2. The fishing lure as set forth in claim 1 in combination with a leader extending through the bore of the head and the socket in the plug of the tail, and a barbed hook attached to an end of the leader rearwardly of the plug.

3. A fishing lure assembly comprising a head, a tail, a leader and a hook; said head having a bore running therethrough from the front to the back, said bore having a dimension sufficient to accommodate said leader, and said head having an externally threaded, rearwardly extending stud, said bore passing through said stud; said tail having a circumferentially continuous plug having a continuous peripheral wall that is free of a slot therethrough through which a fishing leader can pass, said plug having an internally threaded socket having a passage of sufficient dimension for permitting the passage therethrough of the hook and being dimensioned and configured to selectively, threadedly engage said stud on said head; said leader running through said bore in said head, through said bore in said stud and through the circumferentially continuous plug of said tail; said hook being attached to said leader rearwardly of said plug.

4. A fishing lure as set forth in claim 3 wherein said tail includes a rearwardly trailing shroud portion, and part of said leader lies within said shroud portion.

5. A fishing lure assembly as set forth in claim 4 wherein said head is configured and ornamented to simultate the head of a bait fish, and said shroud is configured and ornamented to be attractive to bait fish.

6. A fishing lure assembly as set forth in claim 5 wherein said shroud comprises a forward, circumferentially continuous body terminating in a plurality of longitudinally extending flexible strips, and a cylindrical body being attached to said plug and ornamented to be attracted to game fish, a part of said leader extending within the circumference of said shroud.

7. A fishing lure assembly as set forth in claim 3 wherein limiting means are provided on said leader in front of said head and rearwardly of said head to prevent said leader from passing completely out of said head in either direction, whereby a permanently assembled leader, hook, and head is provided, together with a selectively interchangeable tail.

8. A method of handling a fishing lure assembly of the type having a head, a tail, a leader and a hook; said head having a bore running therethrough from the front to the back, said bore having a dimension sufficient to accommodate said leader, said head having an externally threaded, rearwardly extending stud, said bore passing through said stud; said tail having a circumferentially continuous plug with a continuous peripheral wall that is free of a slot therethrough through which the leader can pass, said plug having an internally threaded socket having a passage of sufficient dimension for permitting the passage therethrough of the hook and being dimensioned and configured to selectively, threadedly engage said stud on said head; said leader running through said bore in said head, through said bore in said stud and through the circumferentially continuous plug of said tail; said hook being attached to said leader rearwardly of said plug, said method including the steps of manually unthreading the plug of the tail from the stud of the head and thereafter passing the leader with the hook attached thereto through the passage of the socket to thereby separate the tail from the remainder of the fishing lure assembly without cutting or otherwise separating the hook from the leader.

9. The method of claim 8 including the additional step, after the tail has been separated from the remainder of the fishing lure assembly, of inserting the hook into the passage of the socket in the plug; directing said hook and the leader attached to the hook through said passage in the socket; and, after the hook and a portion of the leader attached to said hook have been passed through the passage in the socket, threading the socket onto the stud of the head, to thereby provide a complete fishing lure assembly including the head, tail, leader and hook.

* * * * *